July 31, 1951     M. C. LARSON     2,562,621

NUT LOCK

Filed Feb. 28, 1950

Magnus C. Larson
INVENTOR.

BY *Clarence A. O'Brien*
*and Harvey B. Jackson*
Attorneys

Patented July 31, 1951

2,562,621

UNITED STATES PATENT OFFICE 2,562,621

NUT LOCK

Magnus C. Larson, Philadelphia, Pa.

Application February 28, 1950, Serial No. 146,687

4 Claims. (Cl. 151—30)

This invention relates to an improved nut lock of that type in which a helical locking spring is carried by the nut and adapted to tightly embrace and fit into the threads of a bolt on which the nut may be screwed.

The primary object of the present invention is to provide improved means whereby the locking spring may be readily set and effectively retained in either locking or unlocked condition.

Another object is to provide a simple, inexpensive and efficient nut lock of the above type which may be readily set to permit free screwing of the nut onto or off of the bolt, and to effectively prevent unscrewing of the nut.

The invention consists of the novel construction and combination of parts shown in the accompanying drawing, in which.

Figure 1:
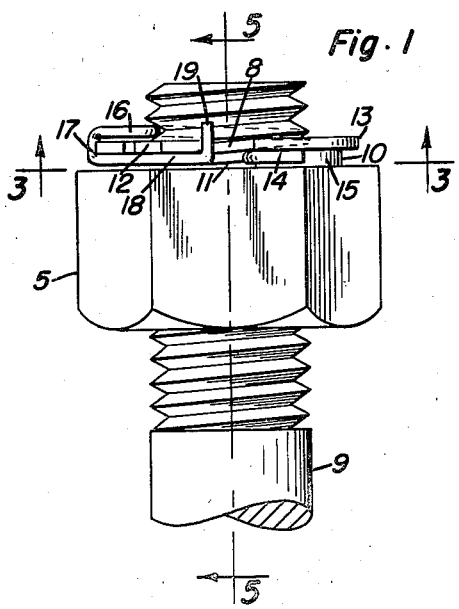
Figure 1 is a fragmentary elevational view of a nut applied to a bolt and provided with a locking spring in accordance with the present invention, the locking spring being set in locking condition.

Referring in detail to the drawing, 5 indicates a nut having a threaded opening 6 and provided at its outer end with a smooth counterbore 7 forming an annular chamber for partial reception of a helical locking spring 8 whose coils are of a normal diameter to tightly embrace and fit in the thread of a bolt 9 on which the nut is adapted to be screwed. The counterbored end of the nut is provided with an external annular groove 10, a relatively wide radial slot 11 in and at one side of said counterbored end, and a peripheral notch 12 in the flange 13 forming the outer wall of the groove 10 and at a point adjacent and clockwise of the slot 11.

The inner end of spring 8 is formed with an outward hook 14 which is engaged about the end of the bottom wall 15 of groove 10 at the anticlockwise side of slot 11. The outer end of spring 8 has a substantially radial portion 16 which is extended outwardly across the outer end of the nut at one side thereof, a longitudinal portion 17 which extends across the flange 13, an arcuate portion 18 which extends circumferentially of and within the groove 10 of the nut, and a terminal portion 19 which extends outwardly longitudinally of the bolt and is selectively engageable in the slot 11 or in the notch 12.

Figure 2:
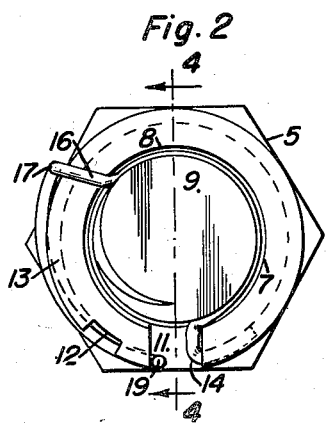
Figure 2 is an end elevation thereof.
Figure 3:
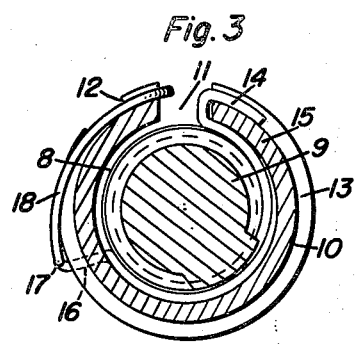
Figure 3 is a transverse section taken on the line 3—3 of Figure 1.
Figure 5:
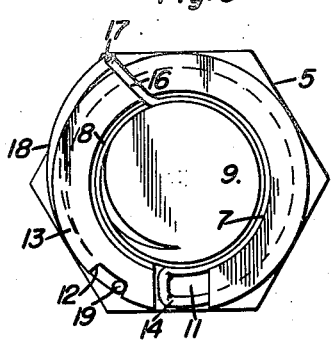
Figure 5 is an end elevation with the locking spring set in unlocked condition; and, Figure 6 is a side elevational view of the locking spring.
Figure 4:
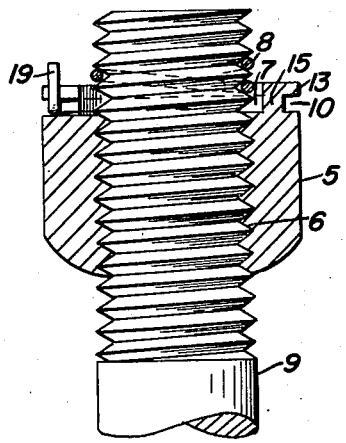
Figure 4 is a longitudinal section taken on the line 4—4 of Figure 2.
Figure 6:
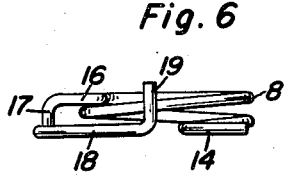

When the terminal portion 19 is engaged in the slot 11 at one side of the latter, the hook 14 is engaged with the wall 15 at the other side of said slot as shown in Figure 2, and the spring tightly grips the thread of the bolt to prevent turning of the nut in either direction. Any attempt to turn the nut in either direction will cause a pull on an end of the spring to tighten the coils of the latter. The spring may be unlocked by forcing the terminal portion 19 out of the slot 11 so as to loosen the coils of said spring. The nut may then be turned relative to the spring until the portion 19 snaps into the notch 12 as shown in Figure 5. In this way, the coils of the spring are kept loose so that the nut may be freely turned in either direction. At this time, turning of the nut in either direction will cause an end of the spring to be pushed so as to increase the loosening of the coils. To lock the nut again, it is simply necessary to spring the portion 19 out of notch 12 and turn the nut in a clockwise direction until said portion 19 snaps into slot 11.

What is claimed as new is:

1. A nut lock comprising a nut having a threaded opening, a counterbore at its outer end, an external annular groove in the counterbored end, a relatively wide radial slot in and at one side of said counterbored end, and a peripheral notch in the portion of the nut forming the outer wall of said groove and at a point adjacent said slot, and a helical locking spring partially disposed in said counterbore and having coils of a normal diameter to tightly embrace and fit in the thread of a bolt on which the nut is adapted to be screwed, the inner end of said spring being formed with an outward hook engaged about an end of the portion of the nut forming the bottom wall of said groove and at one side of said slot, the outer end of said spring having a portion extending outwardly across the outer end of the nut at one side thereof, a portion extending across the portion of the nut forming the outer wall of said groove, a portion extending circumferentially of the nut within said groove, and a terminal portion extended outwardly longitudinally of the bolt and selectively engageable in the slot or in the notch to respectively set the spring in locking or unlocked condition.

2. A nut lock comprising a nut having a threaded opening, a counterbore at its outer end, an external annular groove in the counterbored end, a relatively wide radial slot in and at one side of said counterbored end, and a peripheral notch in the portion of the nut forming the outer wall of said groove and at a point adjacent said slot, and a helical locking spring partially disposed in said counterbore and having coils of a normal diameter to tightly embrace and fit in the thread of a bolt on which the nut is adapted to be screwed, the inner end of said spring being formed with an outward hook engaged about an end of the portion of the nut forming the bottom wall of said groove and at one side of said slot, the outer end of said spring having a portion extending outwardly across the outer end of the nut at one side thereof, a portion extending across the portion of the nut forming the outer wall of said groove, a portion extending circumferentially of the nut within said groove, and a terminal portion extended outwardly longitudinally of the bolt and selectively engageable in the slot or in the notch to respectively set the spring in locking or unlocked condition, the hook and the terminal portion of the spring being engageable with opposite sides of the slot in the locking condition to cause an end of the spring to be pulled for tightening the coils thereof upon applying a turning force to the nut in either direction.

3. A nut lock comprising a nut having a threaded opening, a counterbore at its outer end, an external annular groove in the counterbored end, a relatively wide radial slot in and at one side of said counterbored end, and a peripheral notch in the portion of the nut forming the outer wall of said groove and at a point adjacent said slot, and a helical locking spring partially disposed in said counterbore and having coils of a normal diameter to tightly embrace and fit in the thread of a bolt on which the nut is adapted to be screwed, the inner end of said spring being formed with an outward hook engaged about an end of the portion of the nut forming the bottom wall of said groove and at one side of said slot, the outer end of said spring having a portion extending outwardly across the outer end of the nut at one side thereof, a portion extending across the portion of the nut forming the outer wall of said groove, a portion extending circumferentially of the nut within said groove, and a terminal portion extending outwardly longitudinally of the bolt and selectively engageable in the slot or in the notch to respectively set the spring in locking or unlocked condition, the hook and the terminal portion of the spring being respectively engageable with a side of the slot and with a side of the notch in the unlocked condition to cause an end of the spring to be pushed for loosening the coils thereof upon applying a turning force to the nut in either direction.

4. A nut lock comprising a nut having a threaded opening, a counterbore at its outer end, an external annular groove in the counterbored end, a relatively wide radial slot in and at one side of said counterbored end, and a peripheral notch in the portion of the nut forming the outer wall of said groove, and a helical locking spring partially disposed in said counterbore and having coils of a normal diameter to tightly embrace and fit in the thread of a bolt on which the nut is adapted to be screwed, the inner end of said spring being formed with an outward hook engaged about an end of the portion of the nut forming the bottom wall of said groove and at one side of said slot, the outer end of said spring having a portion extending outwardly across the outer end of the nut at one side thereof, a portion extending across the portion of the nut forming the outer wall of said groove, a portion extending circumferentially of the nut within said groove, and a terminal portion extended outwardly longitudinally of the bolt and selectively engageable in the slot or in the notch to respectively set the spring in locking or unlocked condition.

MAGNUS C. LARSON.

REFERENCES CITED

The following references are of record in the file of this patent:

UNITED STATES PATENTS

| Number | Name | Date |
|---|---|---|
| 1,258,777 | Johannessen | Mar. 12, 1918 |
| 1,630,958 | Mauch | May 13, 1927 |
| 1,738,482 | Prussen | Dec. 3, 1929 |

FOREIGN PATENTS

| Number | Country | Date |
|---|---|---|
| 13,579 | Great Britain | June 10, 1909 |
| 879,664 | France | Mar. 2, 1943 |